United States Patent [19]

Umetani et al.

[11] Patent Number: 5,189,094
[45] Date of Patent: Feb. 23, 1993

[54] PROCESS FOR PRODUCING THERMOSET RESIN

[75] Inventors: Hiroyuki Umetani; Hiroo Inata; Shunichi Matsumura; Hiroshi Mera, all of Iwakuni, Japan

[73] Assignee: Teijin Limited, Osaka, Japan

[21] Appl. No.: 680,005

[22] Filed: Apr. 1, 1991

Related U.S. Application Data

[63] Continuation of Ser. No. 333,256, Apr. 5, 1989, abandoned.

[30] Foreign Application Priority Data

Apr. 6, 1988 [JP] Japan .................................. 63-82878
Apr. 6, 1988 [JP] Japan .................................. 63-82879

[51] Int. Cl.$^5$ .................. C08L 67/06; C08L 63/02; C08L 63/04; C08L 61/10
[52] U.S. Cl. .............................. 525/27; 515/31; 515/32; 515/43; 515/49; 515/445; 515/447; 528/288; 528/392; 528/423
[58] Field of Search .................. 525/27, 31, 32, 43, 525/49, 447, 445; 528/288, 392, 423

[56] References Cited

U.S. PATENT DOCUMENTS

| | | |
|---|---|---|
| 3,493,635 | 2/1970 | Davis et al. . |
| 4,551,511 | 11/1985 | Goel . |
| 4,675,371 | 6/1987 | Goel ................................. 528/392 |
| 4,761,457 | 8/1988 | Arita ................................. 528/288 |

FOREIGN PATENT DOCUMENTS 0068487  1/1983  European Pat. Off. .
2055853  3/1981  United Kingdom .

*Primary Examiner*—Patricia A. Short
*Attorney, Agent, or Firm*—Sherman & Shalloway

[57] ABSTRACT

A process for producing a thermoset resin, which comprises reacting (A) a poly(cyclic iminoether), (B) an ethylenically unsaturated compound having a functional group reactive with the poly(cyclic iminoether), and (C) an ethylenically unsaturated monomer having no functional group reactive with the poly(cyclic iminoether), in the presence of an acid catalyst and a radical catalyst. Instead of the compound (B), there may be used the compound (D), i.e. a compound having at least two equivalents of at least one group selected from the class consisting of carboxyl, hydroxyl, amino, epoxy and carboxylic anhydride groups in the molecule and being free from an ethylenically unsaturated bond. The present application provides also a thermosetting composition and a thermoset resin.

19 Claims, No Drawings

PROCESS FOR PRODUCING THERMOSET RESIN

This application is a continuation of application Ser. No. 07/333,256, filed Apr. 5, 1989, now abandoned.

This invention relates to a process for producing a thermoset resin. More specifically, it relates to a process for producing a thermoset resin having excellent thermal resistance, chemical resistance and mechanical properties with excellent moldability at a high curing speed.

With a technological advance in recent years, resins having excellent thermal resistance, mechanical properties and moldability have been required. Among them, resins obtained by reactive molding using reactive monomers or oligomer have attracted particular attention. In the production of the resins of this type, molding and polymerization are carried out simultaneously using materials having a relatively low viscosity. Polyurethane resins, polyurea resins, nylon resins, epoxy resins and unsaturated polyester resins are known as such resins, and some of them have already come into commercial acceptance.

These resins have advantages and disadvantages. For example, polyurethane resins have low thermal resistance, and unsaturated polyester resins require time for reaction and molding and do not have sufficient properties and moldability.

The following prior art references describe thermoset resins obtained by using oxazolines as one monomer component and the reaction of the oxazolines.

Japanese Laid-Open Patent Publication No. 1533/1984 discloses a process for producing a thermoset resin which comprises reacting bis(2-oxazoline) compound and not more than 1 mole, per mole of the oxazoline compound, of a dicarboxylic acid under heat in the presence of a phosphite ester.

Japanese Laid-Open Patent Publication No. 146924/1988 discloses a process for producing a poly(etheramide) which comprises copolymerizing oxazoline and a bis- or poly-phenolic compound in the presence of an alkali or alkaline earth metal cation complex (catalyst) at a temperature of 100° to 200° C.

Japanese Patent Publication No. 57330/1986 discloses a process for producing an oxazoline-modified unsaturated polyester which comprises reacting an oxazoline derivative having 1 to 4 oxazoline rings in the molecule with an unsaturated polyester having carboxyl groups. This publication states that the reaction is carried out at a temperature of 100 to 250° C. for about 10 minutes to 3 hours.

Japanese Laid-Open Patent Publication No. 48811/1989 discloses a thermosetting unsaturated polyester composition comprising an organic compound having a 2-oxazoline ring and a boiling point of at least 140° C., an unsaturated polyester resin, reinforcing fibers such as glass fibers and a polymerization initiator (peroxide).

U.S. Pat. No. 4,551,511 discloses a process for preparing anhydride/styrene copolymers of higher molecular weight comprising heating a mixture of maleic anhydride, styrene and a small amount of oxazoline at a temperature in the range of from 50° C. to 150° C.

Generally, however, the above thermoset resins do not necessarily have sufficient moldability because temperatures involved in their molding are high.

It is an object of this invention therefore to provide a novel process for producing a thermoset resin.

Another object of this invention is to provide a process for producing a thermoset resin by using a mixture having a new composition, i.e. a mixture comprising a poly(cyclic iminoether), an ethylenically unsaturated compound reactive with the iminoether group and an ethylenically unsaturated monomer non-reactive with the iminoether which optionally may further contain a compound having a group, such as a carboxyl group, reactive with the iminoether group but being free from an ethylenically unsaturated bond.

Still another object of this invention is to provide an industrially advantageous process for producing a thermoset resin, which can perform heat curing reaction within a very short period of time.

Yet another object of this invention is to provide a process for producing a thermoset resin by using a thermosetting composition which does not give off a volatile component during the heat curing reaction, has a low viscosity at the reaction temperature and can therefore be used advantageously as a reactive-moldable composition.

A further object of this invention is to provide a thermoset resin having excellent thermal resistance, mechanical properties and chemical resistance.

A still further object of this invention is to provide a thermoset resin as an excellent composite material obtained by curing a thermosetting composition comprising a fibrous filler.

Additional objects of this invention along with its advantages will become apparent from the following description.

According to this invention the objects and advantages of the invention are achieved firstly by a process for producing a thermoset resin, which comprises reacting (A) a poly(cyclic iminoether) represented by the following formula (I)

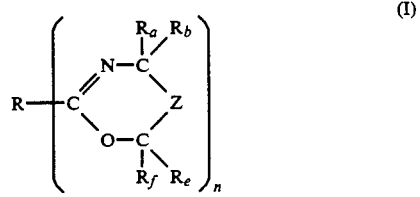

wherein n is an integer of 2 to 4, R represents a hydrocarbon group having a valence of n which may be interrupted or substituted by an atom other than carbon or a group containing an atom other than carbon, Z represents a direct bond or a group of the formula

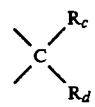

and $R_a$, $R_b$, $R_c$, $R_d$, $R_e$ and $R_f$ are identical or different, and each represents a hydrogen atom, or a methyl, ethyl, propyl, phenyl, tolyl or benzyl group; with the proviso that when n is 2, R may also represent a direct bond, (B) an ethylenically unsaturated compound having an ethylenically unsaturated bond and a functional group reactive with the cyclic iminoether group of the poly(cyclic iminoether), and (C) 10 to 400 parts by weight, per 100 parts by weight of the compounds (A) and (B) combined, of an ethylenically unsaturated monomer having an ethylenically unsaturated bond but no functional group reactive with the cyclic iminoether group of the poly(cyclic iminoether), in the presence of an acid catalyst and a radical catalyst.

Where Z in formula (I) is a direct bond, the poly(cyclic iminoether) of formula (I) are oxazolines of the following formula (I)-1

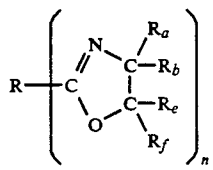

wherein R, $R_a$, $R_b$, $R_e$, $R_f$ and n are as defined with regard to formula (I).

Where Z in formula (I) is the group

the poly(cyclic iminoethers) of formula (I) are oxazines represented by the following formula (I)-2

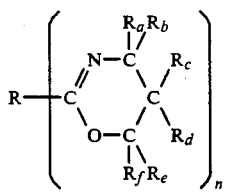

wherein R, $R_a$, $R_b$, $R_c$, $R_d$, $R_e$, $R_f$ and n are as defined with regard to formula (I).

In formula (I) including formulae (I)-1 and (I)-2], R is a hydrocarbon group having a valence of n, which may optionally be interrupted or substituted by an atom other than carbon or a group containing an atom other than carbon. n is an integer of 2 to 4. Accordingly, the hydrocarbon group having a valence of n is a divalent, trivalent or tetravalent hydrocarbon group. When n is 2, R may represent a direct bond.

The hydrocarbon group may be aliphatic, alicyclic or aromatic. Preferably, it is an aliphatic hydrocarbon group having 1 to 10 carbon atoms, an alicyclic hydrocarbon group having 5 to 10 carbon atoms, or an aromatic hydrocarbon group having 6 to 12 carbon atoms.

Where n is 2, examples of preferred hydrocarbon groups R include alkylene groups having 1 to 10 carbon atoms such as methylene, ethylene, trimethylene, 1,2-propylene, tetramethylene, hexamethylene, neopentylene and decamethylene groups; divalent alicyclic groups having 5 to 10 carbon atoms such as cyclohexylene and

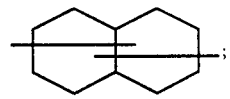

and divalent aromatic hydrocarbon groups having 6 to 12 carbon atoms such as p-phenylene, m-phenylene, naphthylene and biphenylene groups. Where n is 3, examples of preferred hydrocarbon groups R are

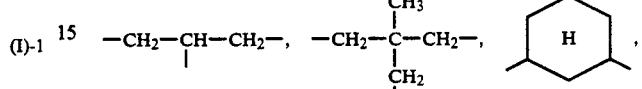

Where n is 4, examples of preferred hydrocarbon carbon groups R are

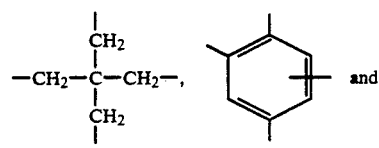

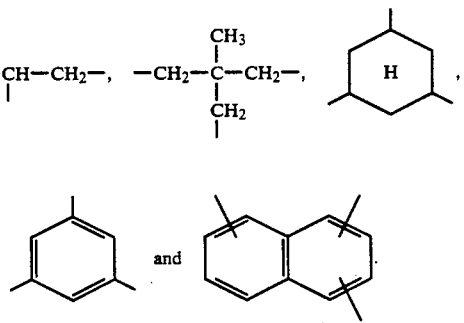

The above hydrocarbon group R may be interrupted by an atom other than carbon, for example an oxygen atom, a sulfur atom, or —$NR_g$— in which $R_g$ is a hydrogen atom or a monovalent hydrocarbon group such as an alkyl group.

The hydrocarbon group may be substituted by a group containing an atom other than carbon. Examples of such a substituent are chloro, bromo, nitro, methoxy, cyano, amido and acetamido.

In formula (I), $R_a$, $R_b$, $R_c$, $R_d$, $R_e$ and $R_f$ are identical or different and each represents a hydrogen atom, or a methyl, ethyl, propyl, phenyl, tolyl or benzyl group. The hydrogen atom or the methyl group is preferred. Especially preferably, all of them are hydrogen atoms, or one of them is methyl and all others are hydrogen atoms.

Examples of the poly(cyclic iminoether) are shown below.

Oxazolines of formula (I)-1

2,2'-bis(2-oxazoline),
2,2'-ethylenebis(2-oxazoline),
2,2'-tetramethylenebis(2-oxazoline),
2,2'-hexamethylenebis(2-oxazoline),
2,2'-octamethylenebis(2-oxazoline), 2,2'-1,4-cyclohexylenebis(2-oxazoline),
2,2'-bis(4-methyl-2-oxazoline),
2,2'-bis(5-methyl-2-oxazoline),
2,2'-m-phenylenebis(2-oxazoline),
2,2'-p-phenylenebis(2-oxazoline),
2,2'-m-phenylenebis(4-methyl-2-oxazoline),
2,2'-m-phenylenebis(5-methyl-2-oxazoline),
2,2'-p-phenylenebis(4-methyl-2-oxazoline),
2,2'-p-phenylenebis(5-methyl-2-oxazoline), and
1,3,5-tris(2-oxazolinyl-2)benzene.

Among them, 2,2'-bis(2-oxazoline, 2,2'-tetramethylenebis(2-oxazoline), 2,2'-m-phenylenebis(2-oxazoline) and 2,2'-p-phenylenebis(2-oxazoline) are preferred.

Oxazines of formula (I)-2

2,2'-bis(5,6-dihydro-4H-1,3-oxazine),
2,2'-ethylenebis(5,6-dihydro-4H-1,3-oxazine),
2,2'-tetramethylenebis(5,6-dihydro-4H-1,3oxazine),
2,2'-hexamethylenebis(5,6-dihydro-4H-1,3oxazine),
2,2'-octamethylenebis(5,6-dihydro-4H-1,3oxazine),
2,2'-1,4-cyclohexylenebis(5,6-dihydro-4H-1,3oxazine),
2,2'-bis(4-methyl-5,6-dihydro-4H-1,3-oxazine),
2,2'-bis(5-methyl-5,6-dihydro-4H-1,3-oxazine),
2,2'-bis(6-methyl-5,6-dihydro-4H-1,3-oxazine),
2,2'-m-phenylenebis(5,6-dihydro-4H-1,3-oxazine),
2,2'-p-phenylenebis(5,6-dihydro-4H-1,3-oxazine),
2,2'-m-phenylenebis(4-methyl-5,6-dihydro-4H-1,3-oxazine),
2,2'-m-phenylenebis(5-methyl-5,6-dihydro-4H-1,3-oxazine),
2,2'-m-phenylenebis(6-methyl-5,6-dihydro-4H-1,3-oxazine),
2,2'-p-phenylenebis(4-methyl-5,6-dihydro-4H-1,3-oxazine),
2,2'-p-phenylenebis(5-methyl-5,6-dihydro-4H- 1,3-oxazine), and
2,2'-p-phenylenebis(6-methyl-5,6-dihydro-4H-1,3-oxazine).

Preferred among them are 2,2'-bis(5,6-dihydro-4H-1,3-oxazine), 2,2'-tetramethylenebis(5,6-dihydro-4H-1,3-oxazine), 2,2'-m-phenylenebis(5,6-dihydro-4H-1,3-oxazine) and 2,2'-p-phenylenebis(5,6-dihydro-4H-1,3-oxazine).

In this invention, poly(cyclic iminoethers) may be used singly or in combination with each other. When two or more of them are used in combination, a combination of oxazolines with each other, a combination of oxazines with each other or a combination of an oxazoline with an oxazine may be selected.

The component (B) used in this invention is an ethylenically unsaturated compound having in the molecule at least one functional group reactive with the cyclic iminoether group of the poly(cyclic iminoether) (A) and at least one ethylenically unsaturated bond.

The functional group capable of reacting with the cyclic iminoether group is preferably a carboxyl group, a hydroxyl group, an amino group, an epoxy group, or an intramolecular carboxylic acid anhydride group.

Both high molecular compounds and low molecular compounds may be used as the component (B). Examples of preferred compounds (B) may include high molecular compounds such as unsaturated polyesters having carboxyl or hydroxyl groups, and low molecular compounds such as organic polycarboxylic acids, intramolecular acid anhydrides, organic polyhydroxy compounds, organic polyamino compounds and organic polyepoxy compounds which have an ethylenically unsaturated bond.

A carbon-carbon double bond adjacent to the carbonyl group, for example, is preferred as the ethylenically unsaturated bond of the component (B).

The unsaturated polyesters as component (B) are preferably unsaturated polyesters having a molecular weight of about 500 to 10000 produced by a known method from alpha,beta-unsaturated dibasic acids and/or their ester-forming derivatives with or without saturated dibasic acids and/or their ester-forming derivatives as a dibasic acid component and polyhydric alcohols and/or organic epoxides such as propylene oxide as an alcohol component.

Examples of the alpha,beta-unsaturated dibasic acids include maleic acid, halogenated maleic acid, fumaric acid, citraconic acid, itaconic acid, halogenated itaconic acid, 5-norbornene-2,3-dicarboxylic acid, methyl-5-norbornene-2,3-dicarboxylic acid, tetrahydrophthalic acid, methyltetrahydrophthalic acid, intramolecular acid anhydrides of these acids, and alkyl esters of these acids. Examples of the saturated dibasic acids are phthalic acid, halogenated phthalic acid, phthalic anhydride, halogenated phthalic anhydride, isophthalic acid, terephthalic acid, hexahydrophthalic acid, hexahydrophthalic anhydride, methylhexahydrophthalic acid, methylhexahydrophthalic anhydride, dibromotetrahydrophthalic acid, dibromotetrahydrophthalic anhydride, succinic acid, succinic anhydride, adipic acid, glutaric acid, pimelic acid, azelaic acid, sebacic acid, and alkyl esters of these acids. As required, monobasic acids such as acrylic acid, methacrylic acid, propionic acid, butyric acid, valeric acid, higher fatty acids, benzoic acid, p-hydroxybenzoic acid and octylic acid and polybasic acids such as trimellitic acid, hemimellitic acid, trimesic acid and benzenetetracarboxylic acid may be used as a modifier.

Examples of the polyhydric alcohol include ethylene glycol, diethylene glycol, triethylene glycol, polyethylene glycol, propylene glycol, dipropylene glycol, tripropylene glycol, polypropylene glycol, 1,3- or 1,4-butylene glycol, tetramethylene glycol, 1,6-hexanediol, neopentyl glycol, hydrogenated bisphenol A, bisphenol A ethylene oxide, and/or propylene oxide adduct.

The polyhydric alcohol is used in an amount substantially equivalent to the dibasic acid component, or in excess of the latter by not more than 20 mole %. As required, monohydric alcohols such as amyl alcohol, hexyl alcohol, pentyl alcohol, octyl alcohol, nonyl alcohol, decyl alcohol and tetrahydrofurfuryl alcohol, and polyhydric alcohols such as glycerol, pentaerythritol, trimethylolethane, trimethylolpropane, trimethylolbutane, sorbitol, erythritol and mesoerythritol may be used as a modifier.

Examples of the organic epoxides include alkylene oxides such as ethylene oxide, 1,2-propylene oxide and epichlorohydrin; glycidyl ethers such as methyl glycidyl ether, ethyl glycidyl ether and allyl glycidyl ether, and glycidyl esters such as methyl glycidyl ester, ethyl glycidyl ester and allyl glycidyl ester. These polyepoxides are used in an amount substantially equivalent to the dibasic acid component or in excess of the latter by not more than 20 mole %.

The unsaturated polyesters may be used as a mixture with each other or with a low molecular compound.

Advantageously, the unsaturated polyester is used in such a proportion that the weight ratio of the poly(cyclic iminoether) to the unsaturated polyester is from 1:15 to 15:1, preferably from 1:12 to 12:1.

Examples of the organic polycarboxylic acids or their intramolecular anhydrides as component (B) include maleic acid, halogenated maleic acid, fumaric acid, citraconic acid, itaconic acid, halogenated itaconic acid, 5-norbornene-2,3-dicarboxylic acid, methyl-5-norbornene-2,3-dicarboxylic acid, tetrahydrophthalic acid, methyltetrahydrophthalic acid, tetrachlorophthalic acid and intramolecular acid anhydrides of these acids.

Examples of the organic polyhydroxy compounds include aliphatic hydroxy compounds such as 2-butene-1,4-diol such as 2-hydroxyethyl fumarate, and aromatic hydroxy compounds such as 3,3'-diallyl bisphenol A, allyl bisphenol A, bis(3-allyl-4-hydroxyphenyl)methane and 3-allyl-4-hydroxyphenyl-p-hydroxytoluene.

Preferably, the organic polyamino compounds may be, for example, aromatic amines and amines having a methylamino group bonded to an aromatic ring, typically 2,4-diaminostyrene.

Examples of the organic polyepoxy compound include glcidyl esters of carboxylic acids containing an ethylenically unsaturated bond as described above, and glycidyl ethers of hydroxy compounds containing an ethylenically unsaturated bond, specifically diglycidyl fumarate, diglycidyl maleate, and diglycidyl ether of 3,3'-diallyl bisphenol A.

Compounds having only one functional groups reactive with the iminoether group in the molecule such as 2-hydroxyethyl methacrylate, 2-hydroxyethyl acrylate and 2-aminoethyl methacrylamide and glycidyl methacrylate may also be used as the component (B).

The aforesaid low molecular compounds may be used singly or in combination with each other. The low molecular compound may be used in such a proportion that the equivalent ratio of the poly(cyclic iminoether) to the low molecular compound is from 10:1 to 1:5, preferably from 5:1 to 1:1.

The component (C) used in this invention is an ethylenically unsaturated monomer having an ethylenically unsaturated bond but no functional group capable of reacting with the cyclic iminoether group of the poly(cyclic iminoether).

Preferred examples of the component (C) are styrene represented by the following formula

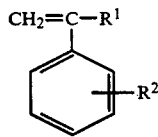

wherein $R^1$ represents a hydrogen atom or a methyl group, $R^2$ represents a hydrogen atom, an alkyl group having 1 to 4 carbon atoms, a halogen atom or a group of the formula

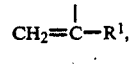

(meth)acrylates represented by the following formula

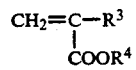

wherein $R^3$ represents a hydrogen atom or a methyl group, and $R^4$ represents an alkyl group having 1 to 10 carbon atoms or a tetrahydrofurfuryl group, vinyl acetate, allyl esters of aromatic polycarboxylic acids, and triallyl (iso)cyanurate.

Examples of the styrenes of the above formula are styrene, alpha-methylstyrene, t-butylstyrene, chlorostyrene, vinyltoluene and divinylbenzene.

Examples of the (meth)acrylates are esters of acrylic or methacrylic acid with aliphatic alcohols such as methanol, ethanol, propanol, octanol, hexanol and tetrahydrofurfuryl alcohol.

Examples of the allyl esters of aromatic polycarboxylic acids are diallyl phthalate and diallyl isophthalate.

The compounds as the component (C) may be used singly or in combination. Styrene is especially preferred as the component (C).

The component (C) is used in an amount of 10 to 400 parts by weight per 100 parts by weight of the components (A) and (B) combined. If the amounts of the components (A), (B) and (C) fall outside the range specified above, the resin composition has a high viscosity and encounters difficulty during molding. Alternatively, the reactivity of the composition is decreased and the reaction requires high temperatures. The properties of the resulting molded product does not have sufficient properties. The preferred proportions of these compounds is that the amount of component (C) is 20 to 300 parts by weight, especially 25 to 250 parts by weight, per 100 parts by weight of the components (A) and (B) combined.

The thermosetting composition used in this invention further includes an acid catalyst and a radical catalyst in addition to the above components (A), (B) and (C).

The acid catalyst is believed to contribute to the ring-opening polymerization of the poly(cyclic iminoether) and the reaction of the poly(cyclic iminoether) with the ethylenically unsaturated compound (B). The radical catalyst is believed to contribute to the opening of the ethylenically unsaturated double bonds of the ethylenically unsaturated compound (B) and the ethylenically unsaturated monomer (C).

Examples of the acid catalyst used in this invention are as follows:

Examples of the compound acting as an acid catalyst are given below.
(i) Protonic acids having a pKa of not more than 2.5
(ii) Esters of protonic acids having a pKa of not more than 1.0
(iii) Salts of protonic acids having a pKa of not more than 2.5
(iv) Lewis acids and complexes thereof
(v) Alkyl halides
(vi) Iodine
(vii) Halogenophenols represented by the following formula (II)

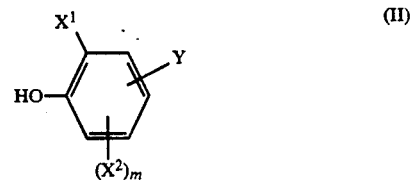

wherein $X^1$ and $X^2$ are identical or different, and each represents a halogen atom, m is 0, 1 or 2, Y is —SO —COR$^2$, —CN or —NO$_2$, R$_1$ represents an alkyl group having 1 to 20 carbon atoms which may be substituted, an aryl group having 6 to 12 carbon atoms or —NR$_3$R$_4$, R$_2$ represents an alkyl group having 1 to 20 carbon atoms which may be substituted, a cycloalkyl group having 5 to 10 carbon atoms, an aryl group having 6 to 12 carbon atoms, —OR$_5$ or —NR$_6$R$_7$, and R$_a$, R$_4$, R$_5$, R$_6$ and R$_7$ are identical or different and each represents a hydrogen atom, an alkyl group having 1 to 20 carbon atoms which may be substituted, a cycloalkyl group having 5 to 10 carbon atoms, or an aryl group having 6 to 12 carbon atoms.

(viii) Halogenophthalic acids represented by the following formula (III)

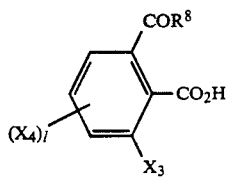
(III)

wherein X$_3$ and X$_4$ are identical or different, and each is selected from the groups defined for X$_1$, l is a number of 0, 1, 2 or 3, and R$_8$ is selected from the groups defined for R$_2$, and/or halogenophthalic acid anhydrides represented by the following formula (IV)

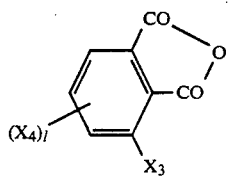
(IV)

wherein X$_3$, X$_4$ and l are as defined above.

The protonic acids (i) having a pKa of not more than 2.5 in (i) are preferably organic sulfonic acids, phosphonic acids or inorganic acids. Specific examples include organic sulfonic acids such as methanesulfonic acid, ethanesulfonic acid, benzenesulfonic acid, trifluoromethanesulfonic acid and p-toluenesulfonic acid, phosphonic acids such as phenylphosphonic acid, and inorganic acids such as sulfuric acid, phosphoric acid, phosphorous acid, phosphinic acid and perchloric acid.

The esters (ii) of protonic acids having a pKa of not more than 1.0 are preferably esters of organic sulfonic acids and esters of inorganic protonic acids. The alcohol components forming the esters are preferably aliphatic alcohols having 1 to 10 carbon atoms. Specific examples of the esters (ii) are sulfonic acid esters such as methyl benzenesulfonate, ethyl benzenesulfonate, methyl p-toluenesulfonate, methyl trifluoromethanesulfonate, ethyl trifluoromethanesulfonate and ethyl D-toluenesulfonate, and esters of inorganic protonic acids such as dimethyl sulfate and diethyl sulfate.

The salts (iii) of protonic acids having a pKa of not more than 2.5 are preferably salts of the protonic acids (i), for example salts with organic amine compounds such as hexmethylenediamine, piperadine, m-xylylenediamine, 4,4'-diaminodiophenylmethane, pyridine, and 2,2'-m-phenylenebis(2-oxazoline).

Examples of preferred Lewis acids and complexes thereof (iv) include such Lewis acids as titanium tetrachloride, tin tetrachloride, zinc chloride, aluminum chloride and boron trifluoride, and complexes of these Lewis acids with ethers or phenols, such as boron trifluoride etherate.

Preferred alkyl halides (v) are alkyl iodides and alkyl bromides. The alkyl group in the alkyl halide (v) preferably has 1 to 10 carbon atoms, and may be substituted by phenyl. Specific examples of the alkyl halide (v) are methyl iodide, ethyl iodide, propyl iodide, butyl iodide, benzyl iodide and benzyl bromide.

The iodine (vi) is elemental iodine.

The halogenophenol (vii) of formula (II) are one type of preferred acid catalysts.

In formula (II), X$^1$ and X$^2$ are identical or different, and each represents a halogen atom. Chlorine and bromine atoms are especially preferred as the halogen atom. m is a number of 0, 1 or 2, preferably 1. When m is 1, X$^2$ is especially preferably bonded at the orthoposition to the hydroxyl group in formula (II).

Y is —SO$_2$R$_1$, —COR$_2$, —CN or —NO$_2$. Formula (II) may be written as follows according to the definition of Y.

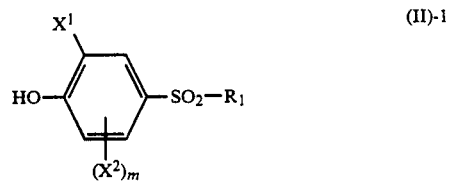
(II)-1 wherein X$^1$, X$^2$ and m are as defined, R$_1$ represents an alkyl group having 1 to 20 carbon atoms which may be substituted, an aryl group having 6 to 12 carbon atoms which may be substituted, or —NR$_3$R$_4$ in which R$_3$ and R$_4$ are identical or different and each represents a hydrogen atom, an alkyl group having 1 to 20 carbon atoms which may be substituted, a cycloalkyl group having 5 to 10 carbon atoms, or an aryl group having 6 to 12 carbon atoms.

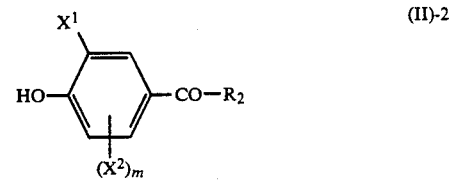
(II)-2 wherein X$^1$, X$^2$ and m are as defined above, and R$_2$ represents an alkyl group having 1 to 20 carbon atoms which may be substituted, a cycloalkyl group having 5 to 10 carbon atoms, an aryl group having 6 to 12 carbon atoms, —OR$_5$ or —NR$_6$R$_7$ in which R$_5$, R$_6$ and R$_7$ are identical or different and each represents a hydrogen atom, an alkyl group having 1 to 20 carbon atoms which may be substituted, a cycloalkyl group having 5 to 10 carbon atoms or an aryl group having 6 to 12 carbon atoms.

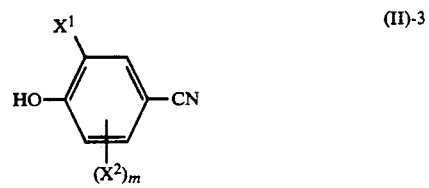
(II)-3 wherein X$^1$, X$^2$ and m are as defined above.

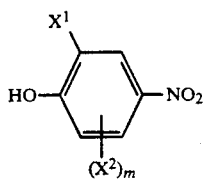

(II)-4 wherein $X^1$, $X^2$ and m are as defined above.

In formula (II)-1, the $C_1$-$C_{20}$ alkyl group for $R_1$ may be linear or branched, and preferably has 1 to 10 carbon atoms. Examples of the alkyl group are methyl, ethyl, n-propyl, isopropyl, n-butyl, isobutyl, sec-butyl, tert-butyl, n-pentyl, n-hexyl, n-heptyl, n-octyl, n-nonyl, n-decyl and n-dodecyl groups. These alkyl groups may be substituted by a substituent selected from, for example, halogens, a hydroxyl group, a carbonyl group, a nitro group, a cyano group, an amino group, alkoxy groups, alkoxycarbonyl groups, acyl groups and acyloxy groups.

Examples of the aryl group having 6 to 12 carbon atoms for $R_1$ are phenyl, tolyl and naphthyl groups. These aryl groups may be substituted by the same substituents as exemplified above as substituents for the alkyl groups.

The optionally substituted $C_1$-$C_{12}$ alkyl groups and $C_6$-$C_{12}$ aryl groups for $R_3$ or $R_4$ in the group —$NR_3R_4$ represented by $R_1$ may be the same as those exemplified above with regard to $R_1$. Examples of the $C_5$-$C_{10}$ cycloalkyl groups for $R_3$ or $R_4$ are cyclopentyl, cyclohexyl and

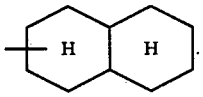

Specific examples of the compounds of formula (II)-1 include bis(3,5-dichloro-4-hydroxyphenyl)sulfone, bis(3,5-dibromo-4-hydroxyphenyl)sulfone, 3,5-dichloro-4-hydroxybenzenesulfonamide, 3,5-dibromo-4-hydroxybenzenesulfonamide, and 3,5-dibromo-4-hydroxybenzenesulfonic acid N-methylamide.

The optionally substituted $C_1$-$C_{20}$ alkyl group, the $C_5$-$C_{10}$ cycloalkyl group, and the $C_6$-$C_{12}$ aryl group for $R_2$ in formula (II)-2 may be the same as those exemplified above with regard to formula (II)-1. $R_6$ and $R_7$ in the group —$NR_6R_7$ may be the same as those exemplified above with regard to $R_3$ and $R_4$.

Examples of group $R_5$ in the group —$OR_5$ represented by $R_2$ may be the same as those given above with regard to groups $R_3$ and $R_4$.

Specific examples of the compounds of formula (II)-2 include bis(3,5-dichloro-4-hydroxyphenyl)ketone, bis(3,5-dibromo-4-hydroxyphenyl)ketone, methyl 3,5-dichloro-4-hydroxybenzoate, methyl 3,5-dibromo-4-hydroxybenzoate, methyl 3,5-dibromo-4-hydroxybenzoate, 3,5-dibromo-4-hydroxybenzamide, 3,5-dibromo-4-hydroxybenzoic acid N-ethylamide, and 3,5-dibromo-4-hydroxybenzoic acid.

Examples of the compounds of formula (II)-3 include 3,5-dichloro-4-hydroxy-benzonitrile, and 3,5-dibromo-4-hydroxybenzonitrile.

Examples of the compounds of formula (II)-4 include 3,5-dichloro-4-hydroxynitrobenzene, and 3,5-dibromo-4-hydroxynitrobenzene.

Of the halogenophenols of formula (II), those having a 4-hydroxy-3,5-dichlorophenyl or 4-hydroxy-3,5-dibromophenyl skeleton are preferred, and (3,5-dibromo-4-hydroxyphenyl)sulfone is particularly preferred.

The halogenophthalic acids of formula (III) and/or the halogenophthalic acid anhydrides of formula (IV) in (viii) above are also a preferred type of catalysts.

In formula (III), $X_3$ and $X_4$ represent the same halogen atoms defined with regard to $X_1$, such as chlorine and bromine atoms. l is a number of 0, 1, 2 or 3. Preferably, l is 1, 2 or 3, above all 2 or 3. $R_8$ in formula (III) is the same as $R_2$ in formula (II).

In formula (IV), $X_3$, $X_4$ and l are as defined for formula (III).

Examples of the compounds of formula (III) and (IV) are given below.

(i) Dicarboxylic acids and their anhydrides
3,4,5,6-tetrabromo(or tetrachloro)phthalic acid, 3,4,5,6-tetrabromo(or tetrachloro)phthalic anhydride, 3,4,5-tribromo(or trichloro)phthalic acid, 3,4,5-tribromo(or trichloro)phthalic anhydride, 3,4,6-tribromo(or trichloro)phthalic acid, and 3,4,6-tribromo(or trichloro)phthalic anhydride.

(ii) Monoesters of dicarboxylic acids
monomethyl 3,4,5,6-tetrabromo(or tetrachloro)phthalate, monoethyl 3,4,5,6-tetrabromo(or tetrachloro)phthalate, monopropyl 3,4,5,6-tetrabromo(or tetrachloro)phthalate, monoisopropyl 3,4,5,6-tetrabromo( or tetrachloro)phthalate, monobenzyl 3,4,5,6-tetrabromo(or tetrachloro)phthalate, monobenzyl 3,4,5,6-tetrabromo(or tetrachloro)phthalate, and monophenyl 3,4,5,6-tetrabromo(or tetrachloro)phthalate.

(iii) Dicarboxylic acid monoamides
3,4,5,6-tetrabromo(or tetrachloro)phthalic monoamide, N-methyl-3,4,5,6-tetrabromo(or tetrachloro)phthalic monoamide, N-ethyl-3,4,5,6-tetrabromo(or tetrachloro)phthalic monoamide, N-propyl-3,4,5,6-tetrabromo(or tetrachloro)phthalic monoamide, N-decyl-3,4,5,6-tetrabromo(or tetrachloro)phthalic monoamide, and N-phenyl-3,4,5,6-tetrabromo(or tetrachloro)phthalic monoamide.

(iv) Ketocarboxylic acids
2-carboxy-3,4,5,6-tetrabromo(or tetrachloro)phenylmethyl ketone and 2-carboxy-3,4,5,6-tetrabromo(or tetrachloro)phenylethyl ketone.

Among these, the dicarboxylic acids and anhydrides thereof are preferred. Tetrachlorophthalic acids, tetrabromophthalic acids, and anhydrides of these are more preferred. Particularly preferred are 3,4,5,6-tetrabromo(or tetrachloro)phthalic acid and 3,4,5,6-tetrabromo(or tetrachloro)phthalic anhydride.

The amount of the acid catalyst is usually 0.01 to 20 mole %, preferably 0.1 to 10 mole %, based on the iminoether group of the poly(cyclic iminoether) (A).

An organic peroxide is preferably used as the radical catalyst used in this invention. Specific examples of the organic peroxide include ketone peroxides such as methyl ethyl ketone peroxide, cyclohexanone peroxide and methyl isobutyl ketone peroxide; hydroperoxides such as cumene hydroperoxide and tertiary butyl hydroperoxide; peroxy esters such as t-butyl peroxyoctoate and t-butyl peroxybenzoate; dialkyl peroxides such as 1,3-bis(t-butyl peroxyisopropyl)benzene, dicumyl peroxide and tris-(t-butylperoxy)triazine, diacyl peroxides such as isobutyryl peroxide, lauroyl peroxide and benzoyl peroxide; peroxyketals such as 1,1-di-t-butylperoxy-3,3,5-trimethylcyclohexane, 1,1-di-t-butylperoxycyclohexane and 2,2-di(t-butylperoxy)butane; and percarbonates such as t-butylperoxyisopropyl carbonate, bis(4-t-butylcyclohexyl)peroxy dicarbonate and di-3-methoxybutyl peroxydicarbonate.

These radical catalysts may be used singly or in combination. The amount of the radical catalyst used is 0.05 to 15 % by weight, preferably 0.1 to 10 % by weight, especially preferably about 0.2 to 5 % by weight, based on the total weight of the components (B) and (C). As required a small amount of organic acid salts of polyvalent metal, for example a salt of a heavy metal such as cobalt, manganese, iron or copper with octylic acid or naphthenic acid, and a polymerization promoter, for example a tertiary amines such as dimethylaniline or dimethyl-p-toluidine, and a polymerization inhibitor such as hydroquinone, naphthoquinone, t-butylcatechol, p-benzoquinone, butylated hydroxytoluene and nitroxide radical may preferably be added to the radical catalyst in order to control the reaction rate and improve the pot life of the catalyst.

The thermoset resin composition of this invention may be reacted and molded by, for example, physically mixing the components (A), (B) and (C), the acid catalyst and the radical catalyst in the form of a solid or fluid intimately, optionally heating the mixture to prepare a thermosetting composition, filling the composition in a mold of a desired shape, and reacting the composition under heat (one-package method), or by dividing the components (A), (B) and (C) into portions in arbitrary proportions, intimately mixing them separately, optionally dissolving them to form two mixtures, mixing the two mixtures by a mixing means such as a mixing head to form a thermosetting composition, directly pouring the composition into a mold of a desired shape heated to the reaction temperature (two package mixing method). In the case of the two package mixing method, a mixture comprising a major proportion of component (A) and a minor proportion of component (B) optionally dissolved in component (C), and a mixture comprising a major proportion of component (B) and a minor proportion of component (A) optionally dissolved in component (C), which are separately preheated, may be used. It is preferred in this method to include the acid catalyst into the mixture comprising component (B) as a main component, and the radical catalyst into the mixture comprising component (A) as a main component.

The reaction temperature differs depending upon the types and proportions of the components (A), (B) and (C), the acid catalyst and the radical catalyst, but is preferably 35° to 280° C., more preferably 45° to 240° C., especially preferably about 55° to 200° C.

The reaction time may be one sufficient for the desired resin to cure. It may vary depending upon the types and proportions of the starting materials, and the reaction temperature, but is preferably 10 seconds to 90 minutes, more preferably 20 seconds to 60 minutes, especially preferably 30 seconds to 45 minutes.

The reaction may be carried out under atmospheric to elevated pressure. To prevent the intrusion of moisture from the atmosphere or oxidative degradation of the resin, the reaction is preferably carried out in an atmosphere of an inert gas such as nitrogen or argon.

As required, the molded product may preferably be heat-treated at a higher temperature than the reaction temperature to attempt to improve its properties further.

As required, the thermoset resin composition of this invention may further include fibrous reinforcing materials such as thermoplastic polymer fibers, carbon fibers or glass fibers, fillers, pigments, coloring agents, antioxidants, ultraviolet absorber, mold releasing agents, etc. The fibrous reinforcing agents may be used in the form of a woven cloth or a mat, and inserted into a reaction mold in advance, and the thermosetting composition of the invention may be filled into the mold. In this case, the reaction of the composition is carried out in the presence of the fibrous reinforcing material, and the product is obtained as a composite containing the cured resin and the reinforcing resin.

According to this invention, the above objects and advantages of the invention can also be achieved by reacting under heat 100 parts by weight of the poly(cyclic iminoether) (A) and the ethylenically unsaturated compound (B) combined, 0 to 400 parts by weight of the ethylenically unsaturated monomer (C) and (D) up to 1.2 equivalents, based on the poly(cyclic iminoether) (A), of a compound having at least two equivalents of at least one group selected from the class consisting of carboxyl, hydroxyl, amino, epoxy and carboxylic anhydride groups in the molecule and being free from ethylenically unsaturated bond in the presence of the acid catalyst and the radical catalyst.

The component (D) may preferably be organic polycarboxylic acids or intramolecular anhydrides thereof, organic polyhydroxy compounds, organic polyamino compounds, organic polyepoxy compounds, organic hydroxycarboxylic acids, organic aminocarboxylic acids or organic hydroxyamino compounds which have no ethylenically unsaturated bond and contains at least two equivalents of functional groups of the same or different kinds in the molecule.

Specific examples of the organic polycarboxylic acids include saturated dibasic acids such as phthalic acid, halogenophthalic acids, isophthalic acid, terephthalic acid, hexahydrophthalic acid, methyl hexahydrophthalic acids, dibromotetrahydrophthalic acids, succinic acids, adipic acid, glutaric acid, pimelic acid, azelaic acid, sebacic acid, and dodecanecarboxylic acids, and polybasic acids such as trimellitic acid, hemimellitic acid, trimesic acid and benzenetetracarboxylic acid.

Examples of preferred organic polycarboxylic acids include adipic acid, glutaric acid, azelaic acid, sebacic acid, dodecanedicarboxylic acids, terephthalic acids and isophthalic acids.

Intramolecular anhydrides of the organic polycarboxylic acids having a 1,2- or 1,3-carboxyl group are preferred as the intramolecular acid anhydrides of the polycarboxylic acids. Specific examples include aliphatic 1,2- or 1,3-dicarboxylic anhydrides such as succinic anhydride, glutaric anhydrides and methylsuccinic anhydride, alicyclic 1,2-dicarboxylic anhydrides such as cyclohexane-1,2-dicarboxylic anhydrides and 3- or 4-methyl-cyclohexane-1,2-dicarboxylic acids, and aromatic 1,2-dicarboxylic anhydrides such as phthalic anhydride, pyromellitic anhydrides and 3,3',4,4'-benzophenonetetracarboxylic anhydride. Of these, the aliphatic dicarboxylic acid anhydrides such as succinic anhydride and glutaric anhydride, cyclohexane-1,2-dicarboxylic anhydride and phthalic anhydride are preferred.

Specific examples of the polyhydroxy compounds include aliphatic hydroxy compounds such as ethylene glycol, propylene glycol, trimethylene glycol, butanediol, hexanediol, octanediol, decamethylene glycol, diethylene glycol, triethylene glycol, glycerol, trimethylolpropane, pentaerythritol, polyoxyethylene glycol, neopentylene glycol, polyoxytetramethylene glycol, bishydroxyethyl terephthalate and bishydroxyethyl isophthalate; alicyclic hydroxy compounds such as cyclohexanedimethanol, dihydroxycyclohexane and trihydroxycyclohexane; aromatic hydroxy compounds such as hydroquinone, resorcinol, methylhydroquinone, chlorohydroquinone, t-butylhydroquinone, t-amylhydroquinone, fluorohydroquinone, bromohydroquinone, 2,5-dichlorohydroquinone, pyrogallol, catechol, 1,3,5-trihydroxybenzene, 2,2-bis(4-hydroxyphenyl)propane, 4,4'-dihydroxydiphenyl, 4,4'-dihydroxydiphenyl ether, 4,4'-dihydroxydiphenylsulfide, 4,4'-dihydroxydiphenylmethane, 1,1-bis(4-hydroxyphenyl)cyclohexane, phenolphthalein, 1,1-bis(4-hydroxyphenyl)ethane, 2,2-bis(3-methyl-4hydroxyphenyl)propane, 2,2-bis(3,5-dimethyl-4-hydroxyphenyl)propane, 3,4'-dihydroxydiphenyl ether; halogenated bisphenols such as 2,2-bis(3-chloro-4-hydroxyphenyl)propane, 2,2-bis(3,5-dichloro-4-phenyl)propane, 2,2-bis(3-bromo-4-hydroxyphenyl)propane, 2,2-bis(3,5-di-bromo-4-hydroxyphenyl)propane, bis(3,5-dichloro-4-hydroxyphenyl)methane, 1,1-bis(3,5-dichloro-4-hydroxyphenyl)ethane, 1,1-bis(3,5-dibromo-4-hydroxyphenyl)ethane, bis(3,5-dichloro-4-hydroxyphenyl)sulfone, bis(3,5-dibromo-4-hydroxyphenyl)sulfone, bis(3,5-dichloro-4-hydroxyphenyl)sulfone, 1,1-bis(3,5-dibromo-4-hydroxyphenyl)cyclohexane, 1,1-bis(3,5-dibromo-4-hydroxyphenyl)cyclohexane, bis(3,5-dichloro-4-hydroxyphenyl)ether, bis(3,5-dibromo-4-hydroxyphenyl)ether, bis(3,5-dibromo-4-hydroxyphenyl)sulfide and bis(3,5-dibromo-4-hydroxyphenyl)ketone; and dihydroxynaphthalene; and polyol compounds obtained by a known process comprising dehydrocondensation of phenols and aldehydes in the presence of an acid or alkaline catalyst.

Examples of the phenols used in the production of the polyol compounds mentioned above may be aromatic hydroxyl-containing compounds such as phenol, cresol, hydroquinone, resorcinol, xylenol, alpha-naphthol, betanaphthol and dihydroxynaphthalene. Of these, phenol is preferred. Examples of the aldehydes used in the production of the polyol compounds are formaldehyde, acetaldehyde, glyoxal, glutaraldehyde, benzaldehyde, p-hydroxybenzaldehyde, m-hydroxybenzaldehyde and terephthalaldehyde. Formaldehyde is especially preferred.

Polyhydroxy compounds having an alcoholic hydroxyl group, 2,2-bis(3,5-bromo-4-hydroxyphenyl)propane, 2,2-bis(3,5-dichloro-4-hydroxyphenyl)propane, phenol novolak and resorcinol obtained from phenol and formaldehyde are especially preferred as the polyhydroxy compounds. The organic polyamino compounds used in this invention may be aliphatic, alicyclic and aromatic compounds having at least two primary and/or secondary amino groups in the molecule. Specific examples include aliphatic polyamine compounds such as ethylenediamine, trimethylenediamine, tetramethylenediamine, hexamethylenediamine, triethylenetetramine, dodecamethylenediamine and neopentylenediamine; alicyclic polyamine compounds such as diaminocyclohexane, isophoronediamine, piperadine, 1-(2-aminoethyl)piperadine, bis(4-aminocyclohexyl)methane and bis(aminomethyl)cyclohexane; aromatic polyamine compounds such as 4,440-diaminodiphenylmethane, 4,4'-diaminodiphenylsulfone, 3,3'-diaminodiphenylsulfone, 4,4'-diaminodiphenylether, 3,4'-diaminodiphenylether, 4,4'-diaminobenzophenone, 3,3'-diaminobenzophenone, p-phenylenediamine, m-phenylenediamine, p-xylylenediamine, m-xylylenediamine, diaminonaphthalene, 4,4'-diaminodiphenylsulfide, 2,4-diaminotoluene, 2,6-diaminotoluene, 1,2-dianilinoethane and diethyldiaminotoluene. Of these, the aromatic polyamine compounds are especially preferred. Where the compounds (B) and (D) have an epoxy group, aliphatic and alicyclic amines may also be used preferably.

The organic polyepoxy compounds used in this invention are polyepoxy compounds containing at least two epoxy groups in the molecule. Examples are given below.

1) Glycidyl ether-type compounds

Aromatic polyols such as 2,2-bis(4-hydroxyphenyl)propane (bisphenol A), 4,4'-dihydroxydiphenylmethane, 4,4'-dihydroxydiphenylsulfone, resorcinol, phenol novolak, cresol novolak, resorcinol novolak, naphthol novolak, dihydroxynaphthalene and dihydroxynaphthalene novolak, polyols obtained by the hydration reaction of aromatic hydroxy compounds such as phenol, dihydroxybenzene, naphthol and dihydroxynaphthalene with aldehydes such as glyoxal, glutaraldehyde, p-hydroxybenzaldehyde and benzaldehyde in the presence of an acid catalyst; and glycidyl ethers of polyols, for example polyhydric alcohols such as butanediol, polypropylene glycol, polyethylene glycol and glycerol, and precursor polymers of the glycidyl ethers.

2) Glycidyl ester compounds

Glycidyl esters of dicarboxylic acids such as phthalic acid, isophthalic acid, tetrahydrophthalic acid and naphthalenedicarboxylic acid, and precursor polymers of the glycidyl esters.

3) N-glycidyl type compounds

Compounds obtained by substituting a glycidyl group for the active hydrogen bonded to a nitrogen atom in nitrogen compounds such as aniline, isocyanuric acid and methylenedianiline.

4) Glycidyl ether ester compounds

Glycidyl ether esters of hydroxycarboxylic acids such as p-hydroxybenzoic acid and hydroxynaphthoic acid. 5) Others Epoxy resins obtained from alicyclic compounds such as cyclopentadiene and dicyclopentadiene, triglycidyl compounds of p-aminophenol and vinylcyclohexene dioxide.

From the viewpoint of availability and the heat resistance of the thermoset resin obtained, preferred are a diglycidyl ether of 2,2'-bis(4-hydroxyphenyl)propane (bisphenol A), a diglycidyl ether of 4,4'-dihydroxydiphenylmethane, a polyglycidyl ether of a phenol novolak, a polyglycidyl ether of naphthol novolak, a polyglycidyl ether of a polyol obtained by dehydration reaction of a phenol with glyoxal, glutaraldehyde, benzaldehyde or p-hydroxybenzaldehyde in the presence of an acid catalyst, a diglycidyl ether of polypropylene glycol, a diglycidyl ether of polyethylene glycol, a diglycidyl ether of butanediol, a diglycidyl ether of glycerol, a triglycidyl ether of glycerol, N,N,N',N'-glycerol, N,N,N',N'- of p-hydroxybenzoic acid, a diglycidyl ether ester of 2-hydroxy-6-naphthoic acid, a triglycidyl compound of p-aminophenol and vinylcyclohexene dioxide. The glycidyl ether of bisphenol A, the polyglycidyl ether of phenol novolak, the polyglycidyl ether of 2-naphthol novolak and the polyglycidyl ether of the polyol obtained by dehydration reaction of phenol with glyoxal, glutaraldehyde, benzaldehyde or p-hydroxybenzaldehyde in the presence of an acidic catalyst, a diglycidyl ether of polypropylene glycol, a diglycidyl ether of polyethylene glycol, a diglycidyl ether of butanediol, a diglycidyl ether of glycerol N,N,N',N'-tetraglycidylmethylenedianiline, a triglycidyl compound of p-aminophenol and vinylcyclohexene dioxide are especially preferred. These compounds may be used singly or in combination.

The compounds containing dissimilar functional groups may include, for example, organic hydroxycarboxylic acids such as p-hydroxybenzoic acid and salicylic acid; organic aminocarboxylic acids such as p-aminobenzoic acid or DL-alanine; organic hydroxyamino compounds such as aminophenol and ethanolamine; carboxylic acid anhydrides such as trimellitic anhydride. Of these organic hydroxycarboxylic acids such as p-hydroxybenzoic acid and salicylic acids, trimellitic anhydride and aminophenol are preferred.

As the compound (D), one or a combination of two or more of the above compounds may be used.

The polycyclic iminoether (A), the ethylenically unsaturated compound (B) and the ethylenically unsaturated monomer (C) are used in such proportions that the amount of the component (C) is 0 to 400 parts by weight per 100 parts by weight of the components (A) and (B) combined. If the amounts of the components (A), (B), (C) and (D) fall outside the above-specified ranges, the resulting resin composition has a high viscosity and encounters difficulty in molding, or the reactivity of the composition is reduced and a high temperature is required for its reaction. The properties of the molded product are not sufficient. The preferred amount of the component (C) is 10 to 300 parts by weight, especially 20 to 250 parts by weight, on the same basis.

The amount of the component (D) is such that the total amount of the carboxyl group, hydroxyl group, amino group, epoxy group and carboxylic acid anhydride group is not more than 1.2 equivalents, based on the iminoether group of poly(cyclic iminoether), preferably not more than the equivalent weight $\times 1.0$, more preferably not more than the equivalent weight $\times 0.9$, on the same basis. The use of the saturated compound (D) makes it possible to advantageously control the reaction and to adjust the density of the crosslinkage.

To cure the thermosetting composition of this invention containing the component (D) under heat, the same methods as described above may be employed. When the two package method is used, the two mixtures may preferably be formed by using the component (D) as a major or minor component together with the component (B).

It should be understood that the above description of the thermosetting composition comprising the components (A), (B) and (C) shall apply to the thermosetting composition which further contains the component (D) except as described specifically with respect to the component (D). Both of the above thermosetting compositions may include a small amount of another component which is different from the component (D) and can perform addition action with the components (A), (B) and (C). The other component may be, for example, an isocyanate, a saturated monocarboxylic acid, a saturated monohydroxy compound, a saturated monoamine, and a saturated monoepoxy compound.

Where the same radical initiator is used, the thermoset resin composition of this invention can shorten the reaction time more so than the unsaturated polyester resins, and therefore, the molding cycle can be shortened. The resulting thermoset resin product has good physical properties such as mechanical properties, chemical resistance and thermal resistance, and even in the absence of a reinforcing material, does not undergo cracking.

The following examples illustrate the present invention in detail. It should be understood that the invention should not be limited to these examples.

In the Examples, all parts are by weight. The heat distortion temperature of a molded plate sample was measured by heat-treating the sample at 150° C. for 5 hours, and then measuring the heat distortion temperature at a temperature elevation rate of 10° C./min. by a DMA (device for measuring dynamic thermomechanical properties).

EXAMPLES 1-5 AND COMPARATIVE EXAMPLES 1-2

A glass reactor was charged with 2.00 parts of an unsaturated polyester (U-PICA 3464, a product of Japan U-Pica Co., Ltd.; diluted with styrene), a predetermined amount of 2,2'-m-phenylenebis(2-oxazoline) and a predetermined amount of each of the catalysts shown in Table 1, and they were well mixed. The inside of the reactor was purged with nitrogen, and the reactor was immersed in an oil bath at a predetermined temperature. The reaction mixture uniformly dissolved and then cured to a transparent pale brown to pale yellow resin after the lapse of each of the periods of time indicated in Table 1. For comparison, the same experiment as above was conducted except that 2,2'-m-phenylenebis(2-oxazoline) and part of the catalyst was not used.

The heat distortion temperatures of the resin obtained in these examples are shown in Table 1. All these resins had excellent thermal resistance and toughness, and showed such excellent solvent resistance that even when immersed in acetone, they hardly underwent dissolution or swelling.

TABLE 1

| Example (Ex.) or Comparative Example (C Ex.) | Amount (parts) of 2,2'-m-phenylenebis-(2-oxazoline) | Catalysts (amount in parts) | | Reaction temperature (°C.) | Curing time (sec.) | Heat distortion temperature (°C.) |
|---|---|---|---|---|---|---|
| Ex. 1 | 0.10 | Perbutyl Z (0.02) | p-toluenesulfonic acid (0.001) | 140 | 35 | 128 |
| Ex. 2 | 0.20 | Perbutyl Z (0.02) | ethyl p-toluenesulfonic acid (0.005) | 140 | 25 | 135 |
| Ex. 3 | 0.60 | Perbutyl Z (0.02) | iodomethane (0.018) | 140 | 45 | 158 |
| Ex. 4 | 0.10 | Percadox 14 (0.02) | iodine (0.002) | 120 | 91 | 135 |
| Ex. 5 | 0.60 | Percadox 14 (0.02) | methyl benzenesulfonate (0.01) | 140 | 45 | 174 |
| C Ex. 1 | 0 | Perbutyl Z (0.02) | | 140 | 45 | 112 |

TABLE 1-continued

| Example (Ex.) or Comparative Example (C Ex.) | Amount (parts) of 2,2'-m-phenylenebis-(2-oxazoline) | Catalysts (amount in parts) | Reaction temperature (°C.) | Curing time (sec.) | Heat distortion temperature (°C.) |
| --- | --- | --- | --- | --- | --- |
| C Ex. 2 | 0 | Percadox 14 (0.02) | 120 | 70 | 120 |

*Perbutyl Z (made by Nippon Oil and Fats Co., Ltd.)
Percadox 14 (made by Kayaku Noury Co.)

EXAMPLE 6

A glass reactor was charged with 1.1 parts of an unsaturated polyester (U-PICA 8542, made by Japan U-Pica Co., Ltd.), 0.9 part of styrene and 0.10 part of 2,2'-p-phenylenebis(2-oxazoline), and they were uniformly mixed in an oil bath at 80° C. Then, 0.02 part of Perbutyl Z (made by Nippon Oil and Fats Co., Ltd.) and 0.002 part of methyl p-toluenesulfonate were added, and the reactor was immediately immersed in an oil bath at 140° C. In 80 seconds, the mixture cured to give a transparent pale yellow resin. The heat distortion temperature of the resulting resin was 140° C. The resin was tough, and had such excellent solvent resistance that even when immersed in acetone, it hardly underwent dissolution or swelling.

EXAMPLE 7

A component A composed of 60 parts of an unsaturated polyester (U-PICA 8524, made by Japan U-Pica Co., Ltd.), 50 parts of styrene and 0.5 part of benzenesulfonic acid and a component B composed of 50 parts of an unsaturated polyester (U-PICA 8524), 50 parts of styrene, 10 parts of 2,2'-m-phenylenebis(2-oxazoline) and 3 parts of Perbutyl Z (made by Nippon Oil and Fats Co., Ltd.) were each melted at 80° C. in a nitrogen stream to form a liquid A and a liquid B.

The liquids A and B were put in a mixing head heated at 100° C. and mixed. Immediately then, the mixture was filled in a mold kept at 140° C., and reacted for 90 seconds. The resulting molded product was transparent and tough without bubbles and had a heat distortion temperature of 142° C.

EXAMPLES 8-10

In each run, a glass reactor was charged with 1.00 part of an unsaturated polyester (having a viscosity of 5.6 stokes, an acid value of 38 mg KOH/g and an unsaturated bond content, determined by the dodecylmercaptan method, of 0.295 mole/g and synthesized from 200 mole % of maleic anhydride, 100 mole % of isophthalic acid and 300 mole % of propylene glycol, 1.00 part of styrene, 0.60 part of 2,2'-m-phenylenebis(2-oxazoline) and 0.02 part of Nyper BMT-M (made by Nippon Oil and Fats Co., Ltd.) and a predetermined amount of each of the catalysts shown in Table 2 and after stirring these materials sufficiently, the inside of the reactor was purged with nitrogen. The reactor was immersed in an oil bath at a predetermined temperature. The reaction mixture dissolved uniformly and then cured to a transparent pale brown or pale yellow resin after the lapse of each of the periods of time indicated in Table 2.

Table 2 shows the heat distortion temperatures of the resins obtained in these examples. It is seen that they had excellent thermal resistance and were tough. They had such excellent solvent resistance that even when immersed in acetone, they hardly underwent dissolution or swelling.

TABLE 2

| Example | Catalyst (amount in parts) | Reaction temperature (°C.) | Curing time (sec.) | Heat distortion temperature (°C.) |
| --- | --- | --- | --- | --- |
| 8 | trifluoromethanesulfonic acid (0.018) | 100 | 80 | 138 |
| 9 | methyl trifluoromethanesulfonate (0.030) | 90 | 100 | 132 |
| 10 | diethyl sulfate (0.024) | 70 | 155 | 130 |

EXAMPLE 11

A glass reactor was charged with 1.00 part of an unsaturated polyester (having a viscosity of 3.6 stokes, an acid value of 39 mg KOH/g, an unsaturated bond content of 0.417 mole/g, and synthesized from 100 mole % of maleic anhydride and 100 mole % of propylene glycol), 1.00 part of styrene, 0.60 part of 2,2'-m-phenylenebis(2-oxazoline), 0.04 part of Nyper BMT-M (made by Nippon Oil And Fats Co., Ltd.) and 0.03 part of ethyl trifluoromethanesulfonate, and these materials were well mixed. After the inside of the reactor was purged with nitrogen, the reactor was immersed in an oil bath at 90° C. The reaction mixture uniformly dissolved and then cured in 101 seconds to a transparent pale yellow resin.

The resulting resin had a heat distortion temperature of 141° C. and thus was excellent in thermal resistance. The resin was tough, and had such excellent solvent resistance that even when immersed in acetone, it scarcely underwent dissolution or swelling.

EXAMPLE 12

A glass reactor was charged with 1.0 part of the same unsaturated polyester as used in Examples 8 to 10, 1.0 part of styrene, 0.6 part of 2,2'-m-phenylenebis(5,6-dihydro-4H-1,3-oxazine), 0.018 part of methyl p-toluenesulfonate and 0.02 part of Perbutyl Z (made by Nippon Oil and Fats Co., Ltd.), and the materials were well mixed. The inside of the reactor was purged with nitrogen, and the reactor was immersed in an oil bath maintained at 140° C. The reaction mixture uniformly dissolved and then cured in 20 seconds to a yellow resin having a heat distortion temperature of 137° C.

EXAMPLE 13

A glass reactor was charged with 0.5 part of the same unsaturated polyester as used in Examples 8 to 10, 1.2 parts of styrene, 0.1 part of 2,2'-m-phenylenebis(2-oxazoline), 0.005 part of diethyl sulfate, 0.048 part of Kayaester O-50 and 0.024 part of Percadox 14 (made by Kayaku Noury Co.), and these materials were well mixed. After the inside of the reactor was purged with nitrogen, the reactor was immersed in an oil bath kept at 100° C. The reaction mixture uniformly dissolved and cured in 42 seconds to a pale yellow resin. The resin had a heat distortion temperature of 104° C.

EXAMPLE 14

A glass reactor was charged with 1.0 part of the same unsaturated polyester as used in Examples 8 to 10, 1.0 part of methyl methacrylate, 0.6 part of 2,2'-m-phenylenebis(2-oxazoline), 0.04 part of Nyper BMT-M (made by Nippon Oil and Fats Co., Ltd.), 0.02 part of Perbutyl Z (made by Nippon Oil and Fats Co., Ltd.), 0.02 part of Percadox 14 (made by Kayaku Noury Co.), 0.02 part of N,N-dimethyl-p-toluidine, and 0.018 part of diethyl sulfate, and these materials were well mixed. After the inside of the reactor was purged with nitrogen, the reactor was immersed in an oil bath at 80° C.

line), the compound (C) and the catalyst in the amounts indicated in Table 3. These materials were well mixed, and then, the inside of the reactor was purged with nitrogen. The reactor was then immersed in an oil bath at 90° C. The reaction mixture dissolved uniformly, and then cured to a pale brown or pale yellow resin after the lapse of each of the periods of time indicated in Table 3.

For comparison, the above procedure was repeated except that the 2,2'-m-phenylenebis(2-oxazoline) and the compound (C) and part of the catalyst were not used.

The heat distortion temperatures of the resulting resins are shown in Table 3. It is seen that these reins have excellent thermal resistance. The resins were tough and has such excellent solvent resistance that they hardly underwent dissolution or swelling even when immersed in acetone.

TABLE 3

| Example | Amount (parts) of 2,2'-m-phenylenebis-(2-oxazoline) | Compound (C) (amount in parts) | Catalysts (amount in parts) | | Curing time (°C.) | Heat distortion temperature (°C.) |
| --- | --- | --- | --- | --- | --- | --- |
| 15 | 0.36 | adipic acid (0.20) | azobisisobutyronitrile<br>Percadox 14 (*2)<br>diethyl sulfate | (0.01)<br>(0.02)<br>(0.05) | 96 | 120 |
| 16 | 0.36 | cyclohexane dimethanol (0.24) | azobisisobutyronitrile<br>Percadox 14 (*2)<br>ethyl trifluoromethanesulfonate | (0.01)<br>(0.03)<br>(0.04) | 113 | 115 |
| 17 | 0.37 | p-hydroxybenzoic acid (0.20) | Kayaester O-50 (*2)<br>Percadox 14 (*2)<br>methyl trifluoromethanesulfonate | (0.04)<br>(0.02)<br>(0.02) | 84 | 115 |
| 18 | 0.30 | TAMANOL 759 (*1) (0.30) | azobisisobutyronitrile<br>Trigonox 29-B-75 (*2)<br>dimethyl sulfate | (0.02)<br>(0.03)<br>(0.03) | 149 | 134 |
| 19 | 0.31 | 4,4'-methylene-dianiline (0.20) | Kayaester O-50 (*2)<br>Trigonox 29-B-75 (*2)<br>trifluoroethanesulfonic acid | (0.01)<br>(0.03)<br>(0.03) | 72 | 154 |
| 20 | 0.30 | 3,4'-diamino-diphenyl ether (0.22) | Kayaester O-50 (*2)<br>Percadox 14 (*2)<br>BF$_3$ monoetherate | (0.02)<br>(0.02)<br>(0.02) | 200 | 142 |
| 21 | 0.36 | phthalic anhydride (0.24) | azobisisobutyronitrile (0.01)<br>Percadox 14 (*2)<br>ethyl trifluoromethanesulfonate | (0.01)<br>(0.02)<br>(0.03) | 98 | 113 |
| 22 | 0.40 | succinic anhydride (0.20) | Kayaester O-50 (*2)<br>Trigonox 29-B-75 (*2)<br>dimethyl sulfate | (0.01)<br>(0.02)<br>(0.04) | 93 | 115 |
| 23 | 0.41 | maleic anhydride (0.19) | benzoyl peroxide<br>diethyl sulfate | (0.02)<br>(0.03) | 78 | 180 |
| 24 | 0.38 | KP743K (*1) (0.15) | azobisisobutyronitrile<br>Percadox 14 (*2)<br>dimethyl sulfate | (0.01)<br>(0.02)<br>(0.03) | 120 | 117 |
| Comparative Example 3 | 0 | none | Kayaester O-50 (*2)<br>Trigonox 29-B-75 (*2) | (0.01)<br>(0.02) | 83 | 98 |

(*1): a product of Arakawa Chemical Industries, Ltd. (treated for 1 hour at 40° C. to remove volatile components)
(*2): products of Kayaku Noury Co.

for 20 minutes and then in an oil bath kept at 140° C. The reaction mixture dissolved uniformly and then cured to a yellow resin in two minutes after it was transferred to the oil bath at 140° C. The resulting rein was tough and had a heat distortion temperature of 110° C.

EXAMPLES 15-24 AND COMPARATIVE EXAMPLE 3

In each run, a glass reactor was charged with 1.00 part of an unsaturated polyester (having a viscosity of 5.6 stokes, an acid value of 38 mg KOH/g, an unsaturated bond content of 0.295 mole/g, and synthesized from 200 mole % of maleic anhydride, 100 mole % of isophthalic acid and 300 mole % of propylene glycol), 1.00 part of styrene and 2,2'-m-phenylenebis(2-oxazo-

EXAMPLES 25-26

A glass rector was charged with 2.00 parts of unsaturated polyester (U-PICA 3464, made by Japan U-Pica Co., Ltd.; diluted with styrene) or an unsaturated polyester (having a viscosity of 3.8 stokes, an acid value of 39 mg KOH/g and an unsaturated bond content of 0.417 mole/g) prepared from 100 mole % of maleic anhydride and 100 mole % of propylene glycol and diluted with the same weight of styrene (UPE-B), 2.41 parts of 2,2'-m-phenylenebis(2-oxazoline), 1.58 parts of 4,4'-methylenedianiline, 0.02 parts of Kayaester O-50, 0.02 part of Percadox 14 (made by Kayaku Noury Co.) and 0.20 part of ethyl p-toluenesulfonate, and they were well mixed. The inside of the reactor was purged with nitrogen, and the reactor was immersed in an oil bath at 100° C. The reaction mixture uniformely dissolved and then cured to a pale brown or pale yellow resin after the lapse of the curing time shown in Table 4.

TABLE 4

|  | Unsaturated polyester | Curing time (minutes) | Heat distortion temperature (°C.) |
| --- | --- | --- | --- |
| Example 25 | U-PICA 3464 | 7.3 | 153 |
| Example 26 | UPE-B | 5.2 | 168 |

EXAMPLE 27

A glass reactor was charged with 1.00 part of the same unsaturated polyester as used in Examples 15 to 24, 1.00 part of styrene, 0.20 part of 2,2'-p-phenylenebis(2-oxazoline) and 0.10 part of maleic anhydride, and these materials were uniformly mixed in an oil bath at 100° C. To the mixture were added 0.03 part of Trigonox 29B-75 (made by Kayaku Noury Co.) and 0.02 part of ethyl trifluoromethane sulfonate were added, and immediately then, the reactor was immersed in an oil bath at 120° C. The reaction mixture cured in 80 seconds to give a pale yellow resin. The resin had a heat distortion temperature of 125° C., and was tough. It had such excellent solvent resistance that even when immersed in acetone, it hardly underwent dissolution or swelling.

EXAMPLE 28

A component A composed of 60 parts of the same unsaturated polyester as used in Examples 15 to 24, 70 parts of styrene, 63 parts of 4,4'-methylenedianiline and 4 parts of diethyl sulfate and a component B composed of 70 parts of the above unsaturated polyester, 60 parts of styrene, 67 part of 2,2'-m-phenylenebis(2-oxazoline), 2 parts of Kayaester O-50 and 2 parts of Percadox 14 (made by Kayaku Noury Co.) were melted separately in a nitrogen stream at 80° C. to form liquids A and B.

The liquids A and B were mixed by pouring them into a mixing head heated at 90° C., and immediately then, the mixture was filled in a mold heated at 100° C. and reacted for 5 minutes. The resulting resin was transparent and tough without bubbles and had a heat distortion temperature of 164° C.

EXAMPLE 29

Five hundred parts of the same unsaturated polyester as used in Examples 15 to 24, 500 parts of styrene, 90 parts of 4,4'-methylenedianiline and 210 parts of 2,2'-m-phenylenebis(2-oxazoline) were uniformly dissolved at 80° C. The solution was introduced into a tank kept at 60° C. The tank was charged with 20 parts of Kayaester O-50 (made by Kayaku Noury Co.), and 10.5 parts of diethyl sulfate. The mixture was stirred and deaerated under reduced pressure, and subsequently the inside of the tank was purged with nitrogen. The resulting solution was heated to 100° C. under 5 kg/cm², and poured under pressure into a mold in which a glass fiber cloth was placed so that Vf became 26%. The mixture was kept at 100° C. for 30 minutes, and then the product was taken out.

The resulting molded plate was free from bubbling or cracking and had the properties shown in Table 5. It had excellent mechanical properties and had especially good thermal resistance.

TABLE 5

Flexural strength: 34.5 kg/mm²
Flexural modulus: 1460 kg/cm²
ILSS: 3.3 kg/mm²
Heat distortion temperature: >300° C.

The flexural strength, flexural modulus and ILSS were measured by a Tensilon CR-7000/UTM tester made by Toyo Baldwin Co., and the heat distortion temperature, by a HDT & V.S.P.T. tester made by Toyo Seiki Seisakusho Co, Ltd.

EXAMPLES 30–31

One hundred parts of the same unsaturated polyester as used in Examples 15 to 24, 100 parts of styrene and 4,4'-methylenedianiline and 2,2'-m-phenylenebis(2-oxazoline) in the amounts indicated in Table 6 were uniformly dissolved at 85° C. Ethyl p-toluenesulfonate in the amount shown in Table 6, 4 parts of Kayaester O-50, and 2 parts of Percadox 14 (made by Kayaku Noury Co.) were added to the solution. The resulting mixture was put in a mold kept at 90° C., and reacted for 10 minutes. The resulting molded plates were transparent and free from bubbles. The molded plates were heat-treated at 150° C. for 5 hours, and their mechanical properties and heat resistance were measured by a Tensilon CR-7000/UTM tester made by Toyo Baldwin Co., and a HDT & V.S.P.T. tester made by Toyo Seiki Seisakusho Co, Ltd. The plates were very tough and had high thermal resistance.

TABLE 6

| Example | Amount of 4,4'-methylene dianiline (parts) | Amount of 2,2'-m-phenylenebis-(2-oxazoline) (parts) | Amount of p-toluene-sulfonate (parts) | Flexural strength (kgf/mm²) | Flexural modulus (kgf/mm²) | notched Izod impact strength (kg-cm/cm) | Heat distortion temperature (°C.) |
| --- | --- | --- | --- | --- | --- | --- | --- |
| 30 | 60 | 140 | 10 | 19.0 | 382 | 3.0 | 156 |
| 31 | 120 | 280 | 20 | 20.9 | 388 | 3.6 | 160 |

EXAMPLES 32–33

Thirty parts of the same unsaturated polyester as used in Examples 15 to 24, 30 parts of styrene and 2,2'-m-phenylenebis(2-oxazoline) and the compound (D) in the amounts indicated in Table 7 were uniformly dissolved at 100° C., and 1.1 parts of diethyl sulfate, 0.6 part of Percadox 14 (made by Kayaku Noury Co.) and 0.6 part of Perbutyl Z (made by Nippon Oil and Fats Co., Ltd.) were added to the solution, and the mixture was injected into a mold heated to 140° C. and reacted for 10 minutes. The resulting molded plates were transparent and were free from bubbles. The molded plates were heat-treated at 150° C. for 5 hours and then, their notched Izot impact strengths and heat distortion temperatures (by a HDT & V.S.P.T. tester made by Toyo Seiki Seisakusho Co., Ltd.) were measured. The results are shown in Table 7. The molded plates had high thermal resistance and were tough.

TABLE 7

| Example | Amount of 2,2'-m-phenylenebis-(2-oxazoline) used (parts) | Amount of compound (D) used (parts) | notched Izod impact strength (kg-cm/cm) | Heat distortion temperature (°C.) |
|---|---|---|---|---|
| 32 | 35.7 | TAMANOL 759* (25.0) | 1.8 | 152 |
| 33 | 41.0 | adipic acid (19.2) | 3.3 | 98 |

*a product of Arakawa Chemical Industries, Ltd.

EXAMPLE 34

A glass reactor was charged with 0.5 part of the same unsaturated polyester as used in Examples 15 to 24, 1.2 parts of styrene, 0.1 part of 2,2'-m-phenylene-bis(2-oxazoline), 0.07 part of 4,4'-methylenedianiline, 0.005 part of diethyl sulfate, 0.048 part of Kayaester O-50 and 0.024 part of Percadox 14 (made by Kayaku Noury Co.), and they were well mixed. After the inside of the reactor was purged with nitrogen, the reactor was immersed in an oil bath at 100° C. The reaction mixture dissolved uniformly and then cured in 55 seconds to a pale olive-colored resin.

The resin was tough and had a heat distortion temperature of 125° C.

EXAMPLE 35

A component A composed of 20 parts of the same unsaturated polyester as used in Examples 15 to 24, 10 parts of styrene, 6.8 parts of Epikote 828 (made by The Shell Co.) and 0.4 part of ethyl p-toluenesulfonate and a component B composed of 10 parts of styrene, 8 parts of 2,2'-m-phenylenebis(2-oxazoline), 1.2 parts of hexamethylenediamine, 0.8 part of Kayaester O-50 and 0.4 part of Percadox 14 (made by Kayaku Noury Co.) were separately melted under heat to form a liquid A and a liquid B.

The liquids A and B were poured into a mixing head heated at 90° C., and immediately then filled in a mold heated at 120° C. and reacted for 15 minutes. The resulting molded article was pale yellow and tough without bubbles. The molded product had a heat distortion temperature of 115° C.

EXAMPLE 36

A glass reactor was charged with 1.0 part of the same unsaturated polyester as used in Examples 15 to 24, 1.0 part of styrene, 0.2 part of 2,2'-m-phenylenebis(5,6-dihydro-4H-1,3-oxazine), 0.10 part of 4,4'-methylenedianiline, 0.02 part of Kayaester O-50 and 0.01 part of Percadox 14 (made by Kayaku Noury Co.), and 0.006 part of dimethyl sulfate, and they were well mixed. The inside of the reactor was purged with nitrogen, and the reactor was immersed in an oil bath at 100° C. The reaction mixture uniformly dissolved and then cured in 55 seconds to a pale yellow resin having a heat distortion temperature of 128° C.

EXAMPLES 37–46

In each run, a glass reactor was charged with 0.34 part of fumaric acid, 0.5 part of propylene glycol, 2.61 parts of 2,2'-m-phenylenebis(2-oxazoline), 1.0 part of styrene and compound (D) and catalysts indicated in Table 8 in the indicated amounts. These materials were well mixed, and after the inside of the reactor was purged with nitrogen, the reactor was immersed in an oil bath at 140° C. The reaction mixture uniformly dissolved and then cured to a colorless or brown resin in each of the periods of time shown in Table 8.

The heat distortion temperatures of the resins obtained in these examples are shown in Table 8. It is seen from the table that all of the resins obtained had excellent thermal resistance. Furthermore, these resins were tough, and had such excellent solvent resistance that even when immersed in acetone, they scarcely underwent dissolution or swelling.

TABLE 8

| Example | Compound (D) (amounts in parts) | Radical catalyst (amount in parts) | | Acid catalyst (amount in parts) | Curing time (sec.) | Heat distortion temperature (°C.) |
|---|---|---|---|---|---|---|
| 37 | isophthalic acid (0.16) 4,4'-methylenedianiline (0.18) | Kayaester O-50 (*1) Trigonox 29-B-75 (*1) | (0.026) (0.013) | diethyl sulfate (0.034) | 40 | 161 |
| 38 | 4,4'-methylenedianiline (0.25) | Kayaester O-50 (*1) Percadox 14 (*1) | (0.026) (0.013) | ethyl trifluoro-methanesulfonate (0.038) | 38 | 152 |
| 39 | isophthalic acid (0.10) m-xylylenediamine (0.10) | Kayaester O-50 (*1) Trigonox 29-B-75 (*1) | (0.020) (0.015) | methyl trifluoro-methanesulfonate (0.030) | 37 | 145 |
| 40 | adipic acid (0.26) | Kayaester O-50 (*1) Percadox 14 (*1) | (0.020) (0.013) | dimethyl sulfate (0.025) | 62 | 127 |
| 41 | cyclohexanedimethanol (0.29) | azobisisobutyronitrile Trigonox 29-B-75 (*1) | (0.020) (0.014) | diethyl sulfate (0.032) | 70 | 120 |
| 42 | p-hydroxybenzoic acid (0.24) | Kayaester O-50 (*1) Trigonox 29-B-75 (*1) | (0.026) (0.013) | trifluoromethane-sulfonic acid (0.030) | 55 | 123 |
| 43 | TAMANOL 759 (*2) (0.30) | azobisisobutyronitrile Percadox 14 (*1) | (0.020) (0.013) | dimethyl sulfate (0.025) | 79 | 131 |
| 44 | phthalic anhydride (0.29) | Kayaester O-50 (*1) Trigonox 29-B-75 (*1) | (0.026) (0.013) | diethyl sulfate (0.025) | 64 | 118 |
| 45 | succinic anhydride (0.15) | Kayaester O-50 (*1) Percadox 14 (*1) | (0.026) (0.013) | $BF_3$ monoetherate (0.020) | 60 | 120 |
| 46 | TAMANOL 759 (*2) (0.10) 4,4'-methylenedianiline | azobisisobutyronitrile Percadox 14 (*1) | (0.026) (0.013) | diethyl sulfate (0.032) | 43 | 142 |

TABLE 8-continued

| Example | Compound (D) (amounts in parts) | Radical catalyst (amount in parts) | Acid catalyst (amount in parts) | Curing time (sec.) | Heat distortion temperature (°C.) |
|---|---|---|---|---|---|
| | (0.18) | | | | |

(*1): products of Kayaku Noury Co.
(*2): a product of Arakawa Chemical Industries, Ltd.

EXAMPLES 47–48

In each run, a glass reactor was charged with 0.29 part of maleic anhydride, 0.5 part of propylene glycol, 2.61 parts of 2,2'-m-phenylenebis(2-oxazoline), 1.0 part of styrene and the compound (D) and catalysts indicated in Table 9 in the indicated amounts, and they were well mixed. After the inside of the reactor was purged with nitrogen, the reactor was immersed in an oil bath at 120° C. The reaction mixture uniformly dissolved and then cured in each of the periods of time indicated in Table 9 to a pale yellow resin.

The heat distortion temperatures of the resins obtained in these examples are shown in Table 9. It is seen from the table that they had excellent thermal resistance. Furthermore, these resins were tough and had such excellent solvent resistance that even when immersed in acetone, they scarcely underwent dissolution or swelling.

TABLE 9

| Example | Compound (D) (amounts in parts) | Radical catalyst (amount in parts) | | Acid catalyst (amount in parts) | Curing time (sec.) | Heat distortion temperature (°C.) |
|---|---|---|---|---|---|---|
| 47 | isophthalic acid (0.16) 4,4'-methylenedianiline (0.18) | Kayaester O-50 (*) Trigonox 29-B-75 (*) | (0.026) (0.010) | diethyl sulfate (0.034) | 110 | 142 |
| 48 | 4,4'-methylenedianiline (0.20) | Kayaester O-50 Percadox 14 | (0.026) (0.010) | dimethyl sulfate (0.030) | 102 | 138 |

(*): made by Kayaku Noury Co.

EXAMPLE 49

A component A composed of 4.5 parts of fumaric acid, 3.0 parts of propylene glycol, 3.0 parts of styrene, 10 parts of 2,2'-m-phenylenebis(2-oxazoline) and 0.3 part of diethyl sulfate and a component B composed of 2.0 parts of propylene glycol, 7.0 parts of styrene, 16 parts of 2,2'-m-phenylenebis(2-oxazoline), 1.8 parts of 4,4'-methylenedianiline, 0.26 part of Kayaester O-50 and 0.13 part of Trigonox 29-B-75 (made by Kayaku Noury Co.) were separately melted under heat to form a liquid A and a liquid B.

The liquids A and B were poured into a mixing head heated at 130° C., and immediately then, filled in a mold heated at 140° C. and reacted for 5 minutes. The resulting molded product was transparent and tough without bubbles, and had a heat distortion temperature of 148° C.

EXAMPLE 50

A glass reactor was charged with 0.38 part of itaconic acid, 0.5 part of propylene glycol, 2.61 parts of 2,2'-m-phenylenebis(2-oxazoline), 1.00 part of styrene, 0.25 part of 4,4'-methylenedianiline, 0.09 part of dimethyl sulfate, 0.03 part of Kayaester O-50 and 0.02 part of Percadox 14 (made by Kayaku Noury Co.), and they were well mixed. The inside of the reactor was purged with nitrogen, and then the reactor was immersed in an oil bath at 120° C. Then, the oil bath was heated to 140° C. at a temperature elevating rate of 4° C./min. The reaction mixture uniformly dissolved and then cured in 2 minutes and 30 second after the temperature of the oil bath reached 140° C. A pale dark orange-colored resin was obtained. This resin was tough and had a heat distortion temperature of 170° C.

EXAMPLES 51–53

A glass reactor was charged with 0.98 part of maleic anhydride, 0.05 part of methyl p-toluenesulfonate, 0.04 part of Kayaester O-50 (made by Kayaku Noury Co.) and 2,2'-m-phenylenebis(2-oxazoline), propylene glycol and styrene in the amounts indicated in Table 10, and they were well mixed. The inside of the reactor was purged with nitrogen, and the reactor was immersed for 5 minutes in an oil bath heated at 100° C. and then in an oil bath kept at 140° C. The reaction mixture uniformly dissolved, and after the lapse of the curing time shown in Table 10 from the immersion in the 140° C. oil bath, cured to a pale yellow resin.

The heat distortion temperature of the resins obtained in these examples are shown in Table 10.

TABLE 10

| | Amount used (parts) | | | | |
|---|---|---|---|---|---|
| Example | 2,2'-m-Phenylenebis(2-oxazoline) | Propylene glycol | Styrene | Curing time (seconds) | Heat distortion temperature (°C.) |
| 51 | 2.16 | 0.76 | 1.04 | 199 | 107 |
| 52 | 2.16 | 0.76 | 3.12 | 260 | 120 |
| 53 | 1.11 | 0.37 | 2.08 | 291 | 132 |

EXAMPLES 54–59

A glass reactor was charged with 1.00 part of an unsaturated polyester (viscosity 5.6 stokes; acid value 38 mg KOH/g; unsaturated bond content 0.295 mole/g measured by the dodecylmercaptan method) synthesized from 200 mole % of maleic anhydride, 100 mole % of isophthalic acid and 300 mole % of propylene glycol, 0.035 part of diethyl sulfate, 0.027 part of Percadox 14 (made by Kayaku Noury Co.) and 2,2'-m-phenylenebis(2-oxazoline) and compound (D) in the amounts indicated in Table 11, and they were well mixed. The inside of the reactor was purged with nitrogen, and immersed in an oil bath at 140° C. The reaction mixture dissolved uniformly, and then cured to a blackish brown to pale yellow resin after the lapse of the curing time indicated in Table 11.

The heat distortion temperatures of the resins obtained in these examples are shown in Table 11. It is seen that they had excellent thermal resistance. These resins were tough and had such excellent solvent resistance that even when immersed in acetone, they hardly underwent dissolution or swelling.

TABLE 11

| Example | Amount of 2,2'-m-phenylene-bis(2-oxazoline) (parts) | Compound (D) (amount in parts) | Curing time (minutes) | Heat distortion temperature (°C.) |
|---|---|---|---|---|
| 54 | 0.75 | cyclohexane dimethanol (0.25) | 2.0 | 128 |
| 55 | 1.50 | cyclohexane dimethanol (0.50) | 1.2 | 160 |
| 56 | 0.77 | diethylene glycol (0.23) | 1.5 | 114 |
| 57 | 1.21 | 4,4'-methylenedianiline (0.78) | 0.3 | 180 |
| 58 | 0.67 | methylhexahydrophthalic anhydride (0.33) | 1.7 | 110 |
| 59 | 0.67 | adipic acid (0.32) | 2.8 | 104 |

EXAMPLE 60

A glass reactor was charged with 1.44 parts of an unsaturated polyester (viscosity 3.6 stokes; acid value 39 mg KOH/g; unsaturated bond content 0.417 mole/g) synthesized from 100 mole % of maleic anhydride and 100 mole % of propylene glycol, 0.36 part of cyclohexanedimethanol, 0.05 part of dimethyl sulfate and 0.04 part of Percadox 14 (made by Kayaku Noury Co.), and they were well mixed. The inside of the reactor was purged with nitrogen, and the reactor was immersed in an oil bath at 140° C.. The reaction mixture uniformly dissolved, and cured in 2.2 minutes to an orange-colored resin.

The resulting resin had a heat distortion temperature of 112° C., and was tough. It had such excellent solvent resistance that even when immersed in acetone, it hardly undewent dissolution or swelling.

EXAMPLES 61–62

Thirty parts of the same unsaturated polyester as used in Examples 54 to 59, 1.04 parts of diethyl sulfate, 0.83 part of Percadox 14 (made by Kayaku Noury Co.) and 2,2'-m-phenylenebis(2-oxazoline) and cyclohexanedimethanol in the amounts indicated in Table 12 were dissolved uniformly within an oil bath at 120° C. After purging with nitrogen, the solution was poured into a mold heated at 140° C., and reacted for 15 minutes. The resulting molded plate was pale yellow and transparent without bubbles.

The molded plate was heat-treated at 150° C. for 5 hours, and then its notched Izod impact strength and heat distortion temperature (by a HDT & V.S.P.T. tester made by Toyo Seiki Seisakusho Co., Ltd.) were measured, and the results are shown in Table 12.

TABLE 12

| Example | Amount (parts) 2,2'-m-Phenylene-bis(2-oxazoline) | Cyclohexane dimethanol | Notched izod impact strength (kg-cm/cm) | Heat distortion temperature (°C.) |
|---|---|---|---|---|
| 61 | 22.5 | 7.5 | 2.8 | 85 |
| 62 | 45.0 | 15.0 | 1.9 | 120 |

We claim:

1. A process for producing a thermoset resin, which comprises reacting (A) a poly(cyclic iminoether) represented by the following formula (I)

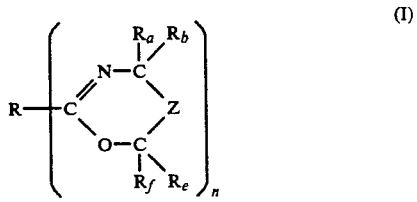

wherein n is an integer of 2 to 4, R represents a hydrocarbon group having a valence of n which may be interrupted or substituted by an atom other than carbon or a group containing an atom other than carbon, Z represents a direct bond or a group of the formula

and $R_a$, $R_b$, $R_c$, $R_d$, $R_e$ and $R_f$ are identical or different, and each represents a hydrogen atom, or a methyl, ethyl, propyl, phenyl, tolyl or benzyl group; with the proviso that when n is 2, R may also represent a direct bond, (B) an ethylenically unsaturated polyester compound having an ethylenically unsaturated bond and a carboxyl or hydroxyl functional group reactive with the cyclic iminoether group of the poly(cyclic iminoether), and (C) 10 to 400 parts by weight, per 100 parts by weight of the compounds (A) and (B) combined, of an ethylenically unsaturated monomer having an ethylenically unsaturated bond but no functional group reactive with the cyclic iminoether group of the poly(cyclic iminoether),.

in the presence of an acid catalyst and a radical catalyst.

2. The process of claim 1 in which the unsaturated polyester is used in such a proportion that the weight ratio of the poly(cyclic iminoether) to the unsaturated polyester is from 1:15 to 15:1.

3. The process of claim 1 in which the ethylenically unsaturated monomer (C) is selected from the group consisting of styrenes represented by the following formula

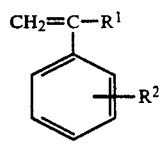

wherein $R^1$ represents a hydrogen atom or a methyl group, and $R^2$ represents a hydrogen atom, a halogen atom, an alkyl group having 1 to 4 carbon atoms, or the group

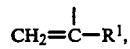

(methyl)acrylic esters represented by the following formula

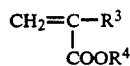

wherein $R^3$ represents a hydrogen atom or a methyl group, and $R^4$ represents an alkyl group having 1 to 10 carbon atoms or a tetrahydrofurfuryl group, vinyl acetate, aromatic polycarboxylic acid allyl esters and triallyl (iso)cyanurate.

4. The process of claim 1 in which the ethylenically unsaturated monomer (C) is styrene.

5. The process of claim 1 in which the acid catalyst contributes to the ring-opening polymerization of poly(cyclic iminoether) and the reaction of poly(cyclic iminoether) with the ethylenically unsaturated compound (B).

6. The process of claim 1 in which the radical catalyst contributes to the opening of the ethylenically unsaturated double bonds of the ethylenically unsaturated compound (B) and the ethylenically unsaturated monomer (C).

7. The process of claim 1 in which the reaction is carried out in the presence of a fibrous filler.

8. A process for producing a thermoset resin, which comprises reacting (A) a poly(cyclic iminoether) represented by the following formula (I)

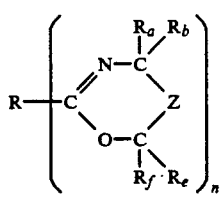

wherein n is the integer of 2 to 4, R represents a hydrocarbon group having a valence of n which may be interrupted or substituted by an atom other than carbon or a group containing an atom other than carbon, Z represents a direct bond or a group of the formula

and $R_a$, $R_b$, $R_c$, $R_d$, $R_e$ and $R_f$ are identical or different, and each represents a hydrogen atom, or a methyl, ethyl, propyl, phenyl, tolyl or benzyl group; with the proviso that when n is 2, R may also represent a direct bond, (B) an ethylenically unsaturated polyester compound having at least one ethylenically unsaturated bond and a functional group reactive with the cyclic iminoether group of the poly(cyclic iminoether)

(C) 10 to 300 parts by weight, per 100 parts by weight of the compounds (A) and (B) combined, of an ethylenically unsaturated monomer having an ethylenically unsaturated bond but no functional group reactive with the cyclic iminoether group of the poly(cyclic iminoether), and (D) more than 0 and up to 1.2 equivalents, based on the cyclic iminoether group of poly(cyclic iminoether) (A), of a compound having at least two equivalents of at least one group selected from the class consisting of carboxyl, hydroxyl, amino, epoxy carboxylic anhydride groups in the molecule and being free from an ethylenically unsaturated bond, in the presence of an acid catalyst and a radical catalyst.

9. The process of claim 8 in which the compound (D) is present and is selected from the group consisting of organic polycarboxylic acids, intramolecular anhydrides of the organic polycarboxylic acids, organic polyhydroxy compounds, organic polyamino compounds, organic polyepoxy compounds, organic hydroxycarboxylic acids, organic aminocarboxylic acids and organic hydroxyamino compounds which have no ethylenically unsaturated bond.

10. The process of claim 8 in which the reaction is carried out in the presence of a fibrous filler.

11. A thermoset resin obtained by the process of claim 8.

12. A composite thermoset resin material obtained by the process of claim 8 in which the reaction is carried out in the presence of a fibrous filler.

13. The process of claim 8 wherein component (D) is present in an amount of more than 0 and up to $0.9 \times$ the equivalent weight of the cyclic iminoether group of poly(cyclic iminoether).

14. The process of claim 8 wherein component (B) is an unsaturated polyester and the ratio of component (A) to component (B) is in the range 1:12 to 12:1.

15. The process of claim 8 wherein the amount component (C) is 20 to 250 parts by weight, per 100 parts by weight of components (A) and (B) combined.

16. The process of claim 8 wherein the radical catalyst is an organic peroxide.

17. The process of claim 8 wherein the radical catalyst comprises 0.2 to 5% by weight of the total weight of components (B) and (C).

18. A thermosetting composition comprising
(A) a poly(cyclic iminoether) represented by the following formula (I),

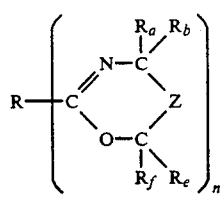

(I)

wherein n is an integer of 2, to 4, R represents a hydrocarbon group having a valence of n which may be interrupted or substituted by an atom other than carbon or a group containing an atom other than carbon or a group containing an atom other than carbon, Z represents a direct bond or a group of the formula

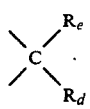

and $R_a$, $R_b$, $R_c$, $R_d$, $R_e$, and $R_f$ are identical or different, and each represents a hydrogen atom, or a methyl, ethyl, propyl, phenyl, tolyl or benzyl group; with the proviso that when n is 2, R may also represent a direct bond, (B) an ethylenically unsaturated polyester compound having a carboxyl or hydroxyl functional group reactive with the cyclic iminoether group of the poly(cyclic iminoether), and (C) 10 to 400 parts by weight, per 100 parts by weight of the compounds (A) and (B) combined, of an ethylenically unsaturated monomer having an ethylenically unsaturated bond but no functional group reactive with the cyclic iminoether group of the poly(cyclic iminoether).

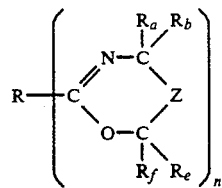

(I)

wherein n is an integer of 2 to 4, R represents a hydrocarbon group having a valence of n which may be interrupted or substituted by an atom other than carbon or a group containing an atom other than carbon, Z represents a direct bond or a group of the formula

and $R_a$, $R_b$, $R_c$, $R_d$, $R_e$, and $R_f$ are identical or different, and each represents a hydrogen atom, or a methyl, ethyl, propyl, phenyl, tolyl or benzyl group; with the proviso that when n is 2, R may also represent a direct bond, (B) an unsaturated polyester compound having at least one ethylenically unsaturated bond and a functional group reactive with the cyclic iminoether of the poly(cyclic iminoether), (C) 10 to 300 parts by weight, per 100 parts by weight of the compounds (A) and (B) combined, of an ethylenically unsaturated monomer having an ethylenically unsaturated bond and having no functional group reactive with the cyclic iminoether group of the poly(cyclic iminoether), and (D) more than 0 and up to 1.2 equivalents, based on the cyclic iminoether group of poly(cyclic iminoether) (A), of a compound having at least two equivalents of at least one group selected from the class consisting of carboxyl, hydroxyl, amino, epoxy and carboxylic anhydride groups in the molecule and being free from an ethylenically unsaturated bond.

19. A thermosettable composition comprising (A) a poly(cyclic iminoether) represent by the following formula (I)

* * * * *